United States Patent [19]

Holtermann et al.

[11] Patent Number: 4,958,661

[45] Date of Patent: Sep. 25, 1990

[54] CHECK VALVE

[75] Inventors: Ludwig K. Holtermann, Old Saybrook; Leighton Lee, II, Guilford, both of Conn.

[73] Assignee: The Lee Company, Westbrook, Conn.

[21] Appl. No.: 391,142

[22] Filed: Aug. 8, 1989

[51] Int. Cl.$^5$ .............................................. F16K 15/14
[52] U.S. Cl. ................................................... 137/843
[58] Field of Search .................................. 137/854, 843

[56] References Cited

U.S. PATENT DOCUMENTS 3,949,934  4/1976  Goglio .......................... 137/843 X
4,415,003  11/1983  Paradis .............................. 137/843

Primary Examiner—Robert G. Nilson
Attorney, Agent, or Firm—Philip J. Lee

[57] ABSTRACT

A check valve that allows flow in one direction only and is suitable for controlling corrosive, chemically active or sensitive fluids comprises a body formed of a suitably inert substance defining inlet and outlet flow passages with a central chamber between the flow passages and an elastomeric disc traversing the central chamber. Centrally located disc stops bias the disc against an annular valve seat comprising a ridge surrounding the flow path and the sealing engagement of the disc and the valve seat prevents flow through the valve. An increase of the pressure differential across the disc sufficient to overcome the resilience of the disc causes the disc to deform whereby the perimeter of the disc lifts off the valve seat and allows flow through the valve. Support stops are provided at the inlet end of the central chamber to prevent the disc from being forced into the inlet flow passage upon exposure to a high back pressure differential. Axially extending channels in the wall of the central chamber provide flow passages around the perimeter of the disc allowing full flow through the valve.

5 Claims, 5 Drawing Sheets

SECTION A-A

SECTION B-B

CHECK VALVE

I. BACKGROUND OF THE INVENTION (a) Field of Invention

The present invention relates generally to check valves permitting flow of fluid media in one direction only and particularly for check valves used to control the flow of corrosive, chemically active, or sensitive fluids such that inert materials are required for all surfaces exposed to the fluid media.

(b) Description of Related art

A number of direct acting check valves exist which consist essentially of a disc traversing a flow passage such that back pressure forces the disk against a valve seat to block the reverse floW. A common limitation of such valves is that a high rate of sensitivity whereby the valve cracks and reseats at low pressure differentials is difficult to achieve in a valve that is also capable of functioning over a wide range of flow rates and pressure conditions. Generally, a high degree of sensitivity is achieved only by incorporating design features which limit the range of conditions under which performance is satisfactory. The particularly limited mechanical properties of suitably inert materials increases the difficulty of designing a valve that will not fail when exposed to high pressure in the blocked direction. A problem with inert materials is their tendency to take a compression set or stick when subjected to high pressures.

Existing U.S. Pats. which may be similar to or pertinent to this invention are as follows:

| U.S. Pat. No. | Inventor | Date |
| --- | --- | --- |
| 3,889,710 | Brost | 06-17-75 |
| 4,141,379 | Manske | 02-27-79 |
| 4,354,492 | McPhee | 10-19-82 |
| 4,415,003 | Paradis, et al. | 11-15-83 |
| 4,556,086 | Raines | 09-03-85 |

U.S. Pat. No. 3,889,710 to Brost discloses a check valve in which a resilient disc prevents reverse flow by engaging an annular and concave Valve seat surface such that the area of the portion of the valve seat that engages the disc is proportionately much greater than that of the present invention. In the event the resilient disc were comprised of inert materials, the large valve seat surface of the disclosure would cause the diaphragm to stick to the valve seat particularly under conditions of high back pressure differentials. In addition, the disclosed invention provides a flow path by utilizing a disc of lesser outside diameter than the inside diameter of the flow chamber which allows the diaphragm to sift and become uneven in its operation.

In U.S. Pat. No. 4,141,379 to Manske, a check valve for use in medical applications is disclosed. The disclosed valve appears to be open in the presence of a low or no pressure differentials as the disc is attached to a transverse screen and S is not in contact with the valve seat in the absence of back pressure differential. In addition, the disc of the disclosed valve is supported at its periphery and the valve is accordingly not opened by deformation of the disc but is apparently opened by the resilience of the screen or the axially movement of the o screen-disc assembly towards a series of stops at the outlet end. No stops are used at the inlet end of the disclosed valve as the valve seat diameter approximates the diameter of the inlet bore. Further the valve is adapted for push-on connections suitable only for very low pressure applications.

U.S. Pat. No. 4,354,492 to McPhee discloses a check valve adapted for push-on connections and designed for low pressure medical applications similar to the valve disclosed in Manske. The McPhee valve similarly has a valve seat of approximately the same diameter as the inlet bore and is closed by means of a disc which is not preloaded or biased against the valve seat thereby causing the valve to be normally in the open position in the absence of back pressure differential. The disclosed valve utilizes widely spaced disc stops radially spaced toward the perimeter of the disc such that the valve does not open by means of axial deformation of the perimeter of the disc.

U.S. Pat. No. 4,415,003 to Paradis, et al. discloses a valve using a flexible disc to control back flow without disc stops on the inlet end to prevent failure upon exposure to high back flow pressure differentials. The disclosed valve additionally has a wide flat annular valve seat surface such that a significantly greater area of the disc is exposed to back pressure than is exposed to the inlet pressure thereby requiring a relatively high pressure differential for opening.

U.S. Pat. No. 4,556,086 to Raines discloses a check valve similarly adapted for push-on connections appropriate for low pressure medical applications. The disclosed valve utilizes a dual substance disc biased against a valve seat by 2 supports spaced 180° apart. Whereby the disclosed valve is opened by the bilateral U-shaped deformation of the dual disc system. No disc stops other than the valve seat are provided in the checked flow direction thereby making the disclosed valve subject to failure upon exposure to high back flow pressure differentials.

None of the foregoing references combine a valve seat of greater diameter than the inlet bore with central disc supports protecting against failure under high back pressure. Those valves that do provide a valve seat of significantly greater diameter than the inlet bore utilize a wide, flat valve seat surface which reduces the area of the disc that is exposed to the inlet pressure and thereby increases the pressure differential required to open the valve. In addition, currently available materials suitable for use in the disc when the check valve is used to control the flow of chemically aggressive or sensitive fluids, including elastomeric polytetrafluoroethylene (PTFE) substances, have a tendency to stick to the surfaces of the wide valve seats of the disclosed valves.

The referenced devices are generally not suitable for high flow, high pressure differential conditions due to the failure to provide both adequate disc support in both ends and sufficient flow capacity. Those of the referenced valves that appear to have relatively large flow capacity typically utilize posts to support the disc, if any support is used. Under high pressure differentials, the discs of such valves would be expected to tend to sag away from the posts and dislodge, blocking the flow passage or otherwise causing the valve to fail.

1. SUMMARY OF THE INVENTION

The invention herein described is an axial flow control device which allows flow in one direction only. A two part, screw fitted valve housing defines an inlet flow passage and an outlet flow passage both of which communicate with a central chamber of enlarged radial dimension. A flat, round disc traverses the central portion of the chamber and sealingly engages an annular valve seat radially surrounding the opening of the inlet flow passage to the chamber such that the engagement of the valve seat and disc prevent flow through the valve. The valve seat protrudes from the wall of the central chamber in the direction of the outlet end of the valve and presents a rounded surface to make a circular line contact and seal with the disc. The disc is biased against the valve seat by means of downstream disc stops on the outlet side of the disc located radially interiorly of the valve seat. A plurality of said stops surround the opening to the outlet flow passage and are spaced from each other to provide a plurality of slots between the stops whereby flow is possible into a central outlet flow passage. The downstream disc stops extend in a upstream direction further than the valve seat and thus engage the disc and serve to bias the disc against the valve seat in the absence of sufficient inlet pressure to cause the deformation of the disc. A plurality of flow passages are also formed by radial recesses in the wall of the chamber radially surrounding the disc. The inlet flow passage opening to the chamber is radially surrounded by a plurality of stops that prevent the disc from being forced into the inlet flow passage under conditions of high back pressure. The upstream disc stops do not extend in a downstream direction further than does the valve seat and thus do not engage the disc except in the presence of high back pressure. The upstream stops are formed as equiangularly displaced longitudinal segments of tubing with inside radii approximating that of the inlet flow passage. The slots between the segments of the upstream stops provide for the exposure of the entire area of the disc within the inside diameter of the valve seat to the pressure of the fluid media of the inlet flow passage. Since the area of the seal between the valve seat and the disc is narrow, nearly all of the area of the inlet side of disc is exposed to the fluid media when the valve is closed. Therefore, if the inlet pressure exceeds the outlet pressure by the small threshold amount required to overcome the resilience of the disc material, the disc will disengage from the valve seat and the valve will open. The downstream stops are similarly formed as angularly displaced longitudinal segments of tubing with inside radii approximating that of the outlet flow passage. The sides of the downstream stops that face the slots between the downstream stops are parallel to each other and are wide enough apart to provide a relatively constant flow capacity through the valve but are small enough to provide ample support for the disc under high pressure and high flow. In both the upstream and downstream stops, the area of the surfaces that provide support for the disc are maximized and are such that the outside edges of the stops define greater chords than do the slots between the stops.

Unless the pressure of the fluid media in the inlet flow passage exceeds the pressure of the fluid media in the outlet flow passage by the threshold amount, the disc sealingly engages the valve seat and prevents passage of the fluid media through the valve. When the pressure of the fluid media in the inlet flow passage exceeds the pressure of the fluid media in the outlet flow passage by the threshold amount, the force of the fluid media against the inlet side of the disc, central to the valve seat, becomes greater than the sum of the opposing forces imposed by the downstream fluid media and by the resilience of the disc. Under such conditions, the perimeter of the disc is axially displaced in a downstream direction, deforming the disc into a relatively hemispherical shape whereby the valve is opened. As the surface of the disc disengages from the valve seat, an annular orifice is created between the valve seat and disc allowing the fluid media to flow from the inlet flow passage radially outward across the orifice defined by the valve seat and disc and around the exterior of the disc, through the slots between the downstream stops and exiting the valve through the outlet floW passage. The downstream disc stops are centrally positioned which allows the perimeter of the disc to be deformed in an axially downstream and radially inward manner, thus opening a wide flow passage through the valve. The radially outside surface of the downstream stops are stepped to prevent the disc from blocking flow through the valve by extruding into or becoming stuck in the outlet flow passage or between the downstream stops under the pressure of high flow conditions.

The preferred embodiment illustrated herein is designed and constructed for miniature applications wherein all wetted surfaces are required to be as chemically inert as possible as required in systems handling minute quantities of reagents, substrate and other chemically aggressive and corrosive fluid media, particularly such systems being developed in medical, biochemical and biotechnical fields. Currently available materials suitable for use in the disc under such conditions primarily include, elastomeric polytetrafluoroethylene (PTFE) substances. The disc is simply cut or stamped from sheet stock and is less expensive than a disc which must be shaped or molded of these materials to provide for the attachment of a support means. It is presumed that the valve would perform similarly in a variety of sizes and when constructed of a variety of materials. Suitable materials for the valve body and disc would vary depending upon the characteristics of the fluid medium and other requirements of particular applications. The mechanical functioning of the valve depends upon the elastomeric properties of the disc rather than the chemical reactivity of the disc material.

The principal aim of the present invention is to provide a new and improved check valve capable of a high flow rate and able to withstand high pressure differential conditions, particularly high back pressures while retaining the characteristic of opening at low pressure differentials.

An additional aim of the present invention is to provide a new and improved check valve capable of economical manufacture, assembly and repair in miniature applications.

An additional object of the present invention is to provide a valve of the foregoing capabilities formed of chemically inert materials for use with corrosive and highly active fluids as well as in applications involving fluids that are sensitive to contamination.

These and other features, uses, objects and advantages of the invention will become apparent from the Description of the Preferred Embodiments and the Drawings.

2. BRIEF DESCRIPTION OF THE DRAWINGS

3. DESCRIPTION OF THE PREFERRED EMBODIMENT(S)

Figure 1:
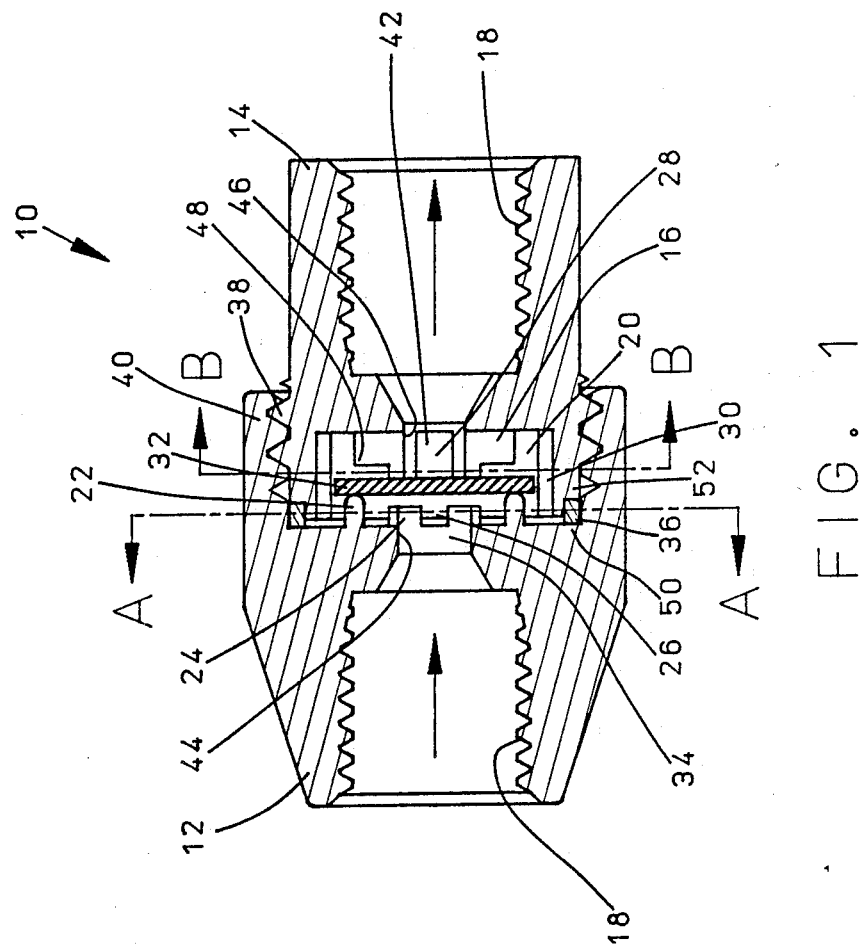
FIG. 1 is an axial sectional view of a check valve in accordance with the present invention shown in a closed position.
Figure 2:
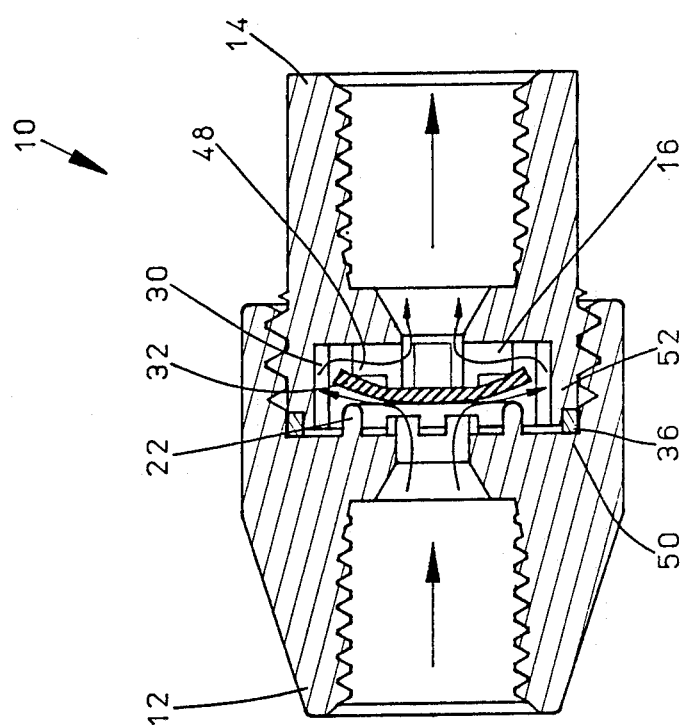
FIG. 2 is an axial sectional view of a check valve in accordance with the present invention shown in an open position.
Figure 3:
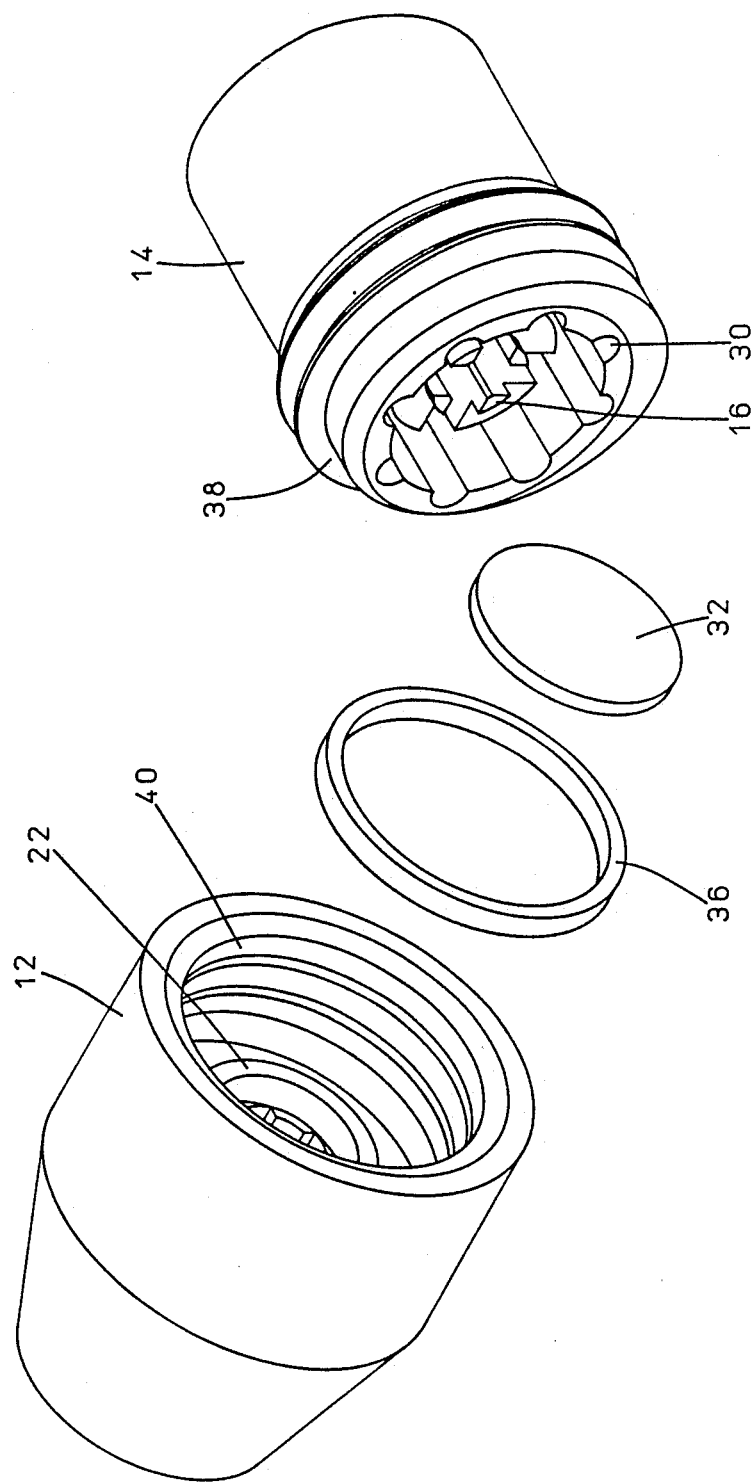
FIG. 3 is a side view of a valve in accordance with FIG. 1 shown in a disassembled state.
Figure 4:
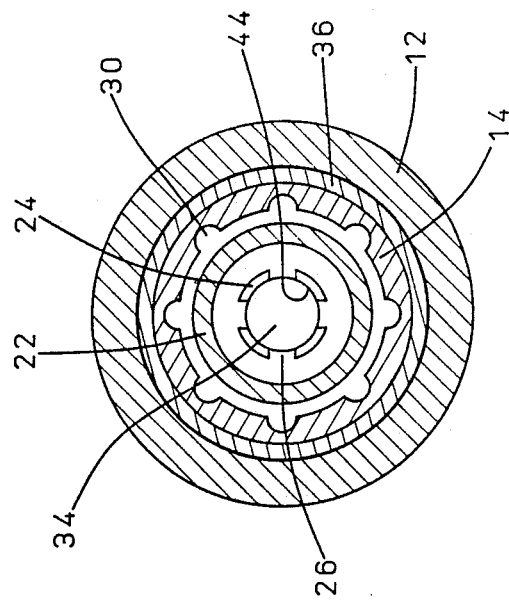
FIG. 4 is a cross sectional view of the check valve in accordance with the present invention taken along the line 4-4 shown in FIG. 1.
Figure 5:
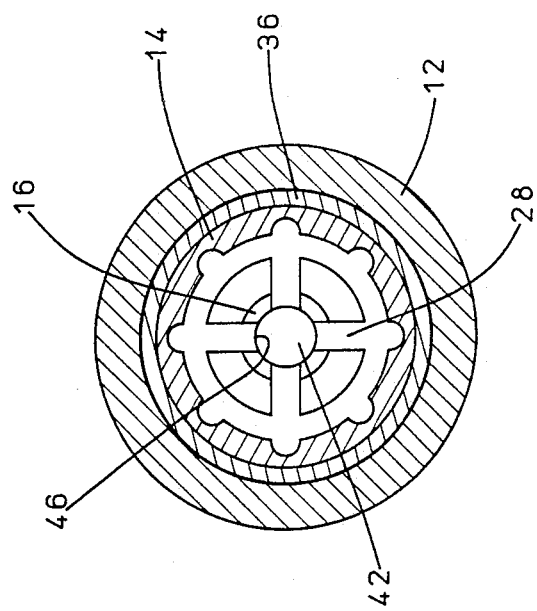
FIG. 5 is a cross sectional view of a check valve in accordance with the present invention taken along the line 5-5 shown in FIG. 1.

With reference to the drawings wherein like numerals represent like parts throughout the figures, a check valve in accordance with the present invention is generally designated in FIG. 1 by the numeral 10. Check valve 10 comprises a housing, which for ease of construction disassembly and repairs, is comprised of an inlet housing section at 12 and outlet housing section 14. In the preferred embodiment illustrated in FIG. 1, the two housing sections are secured by the threading engagement of male threads 38 formed on the circumference of the upstream end of the outlet housing section 14 with female threads 40 formed on the internal surface of the downstream end of the inlet housing section 12. The junction of the housing sections 12 and 14 is sealed by an annular seal ring 36 that is held in place between opposing shoulders 50 and 52 formed in the inlet housing section 12 and the outlet housing section 14, respectively. The seal ring 36 is formed of any substance that is compatible with the fluid media and not as hard as the material used in the housing sections 12 and 14. In the preferred embodiment, the upstream end of the inlet housing section 12 and the downstream end of the outlet housing section 14 each define female threaded and chamfered sections 18 that are adapted as fitting bosses for tubing connectors (not shown). An axially extending inlet flow passage 34 is defined by inlet housing section 12 and is of slightly less internal capacity as the axially extending outlet flow passage 42 that is defined by the outlet section 14. A central valve chamber 20 is formed in part by the downstream end of inlet housing section 12 and in part by the upstream end of outlet housing section 14 and lies axially between inlet flow passage 34 and outlet flow passage 42. The central valve chamber 20 communicates with the inlet flow passage 34 through opening 44 and with the outlet flow passage 42 through opening 46. The central valve chamber 20 is generally cylindrical and is partially traversed by disc 32 which is of slightly less diameter than the internal diameter of the central valve chamber 20. Axially extending channels 30 are formed in that part of the inner surface of the outlet housing section 14 that forms the radially outer wall of the central valve chamber 20 and provide for a flow path around the perimeter of disc 32.

The disc 32 is formed of a flat circular disk which may be cut or stamped from sheet stock of an elastomeric substance which in the preferred embodiment comprises a polytetrafluoroethylene (PTFE) substance, such as that sold under the Trademarks "Kalrez" manufactured by E. I. du Pont de Nemours and Company, Willmington, Delaware or "Chemraz" manufactured by Greene, Tweed & Co., Inc., Kulpsville, Pennsylvania. Although other elastomeric sheet stock may also comprise suitable materials for the disc 32, the indicated materials are selected in the preferred embodiment for their chemically inert properties. It is understood that other suitably elastomeric materials can be used for the disc 32 provided their chemical and mechanical characteristics are compatible with the desired fluid media and applications contemplated. Variations of the material and thickness of the disc 32, or any other change in the resiliency of disc 32, will have a direct effect on the functioning characteristics of valve 10. The materials that are suitable for use in valve 10 for their chemically inert characteristics have limited mechanical properties. For this reason, the performance goals of opening at low pressure differentials is inconsistent with requiring sufficient strength to withstand high back pressures; the disc 32 must be thick enough to have enough strength but not so thick as to unduly compromise responsiveness. In the illustrated preferred embodiment, the disc 32 is 0.02 inches thick and has a diameter of 0.26 inches and is formed of material having a Durometer of 90A. For the sake of economy, the disc 32 is cut from sheet stock and therefore has a uniform thickness.

Similarly, the valve housing sections 12 and 14 may be formed of a wide variety of materials of suitable tensile strength and hardness provided they are chemically compatible with the anticipated flow media. In the experimental models of the illustrated embodiment, the valve housing sections 12 and 14 are formed of CTFE (chlorotrifluoroethylene) manufactured by the Minnesota Mining and Manufacturing Company and sold under the Trademark "Kel-F". It is understood and anticipated that the valve housing sections 12 and 14 of production models may be formed of a thermotropic liquid crystal polymer sold by Celanese under the Trademark "Vectra" and that a number of fluoropolymer materials can be utilized for the valve housing sections 12 and 14.

Disc 32 is biased against an annular valve seat 22 integrally formed by the downstream end of the inlet housing section 12 and radially surrounding opening 44 such that the engagement of the valve seat and disc prevent flow through the valve. Four upstream disc stops 24 form an axially extending annular collar protruding from the downstream end of the inlet housing section 12 into the central valve chamber 20 radially surrounding inlet opening 44 and radially central to the valve seat 22. Upstream disc stops 24 are formed in the shape of angularly displaced longitudinal segments of tubing with inside radii approximating those of the inlet and outlet flow passages 34 and 42 and are coaxial with the flow passages 34 and 42, the valve seat 22, and valve 10. The upstream disc stops 24 serve to prevent extrusion of the disc 32 into the inlet opening 44 upon exposure to high back pressure differentials. Radially extending slots 26 are formed by the separations between the upstream disc stops 24 and provide exposure to the pressure of the inlet media for that part of the surface of the inlet side of the disc 32 which is radially central to valve seat 22, as well as providing some additional flow capacity. The walls of the slots 26, formed by the opposing sides of upstream disc stops 24 are parallel to each other. The upstream disc stops 24 do not extend in a downstream direction further than does the valve seat 22 and thus does not engage the disc 32 except in the presence of enough back pressure to sufficiently deform the disc 32.

The disc engaging surface of valve seat 22 presents a rounded annular ridge for sealing engagement with the radially outer portion of the inlet side of the disc 32. The disc engaging surface of valve seat 22 ridge is a full radius surface presenting a rounded aspect such that the contact between the valve seat 22 and the disc 32 is along a circular line even when the disc 32 is deformed.

The line contact between the valve seat 22 and the disc 32 changes location but does not increase in width, except upon compression of the disc 32, as the deformation of the disc 32 changes in response to changes in the pressure differential across the valve 10. Since the changing deformation of the disc 32 causes the disc 32 to slide and roll in relation to the valve seat 22, the disc engaging surface of valve seat 22 provides a full radius curve as is required to prevent damage to the surface of the disc 32. The sliding and rolling movement of the disc 32 prevents the disc 32 from sticking to the valve seat 22 as otherwise can occur with typical inert elastomeric materials suitable for the disc 32 such as Kalrez, Registered Trademark, E. I. du Pont de Nemours and Company, Willmington, Delaware. Disc 32 is biased against valve seat 22 by four downstream disc stops 16 which radially surround the outlet opening 46 and engage the outlet side of the disc 32. Said downstream disc stops 16 are angularly displaced and are separated by slots 28 which serve as flow passages into the outlet flow passage 42. The walls of the slots 28, formed by the opposing sides of downstream disc stops 16 are parallel to each other. The downstream disc stops 16 are spaced such that the slots 28 are only wide enough to avoid restricting the flow capacity through the valve 10 while providing sufficient support against high pressure differentials. The downstream disc stops 16 are axially separated from the disc engaging surface of the valve seat 22 by less than the thickness of the disc 32 and thus the downstream disc stops 16 forcibly engage the disc 32 and serve to bias the disc 32 against the valve seat 22. With discs 32 of similar resilience and thickness, the axial separation of the downstream disc stops 16 from the disc engaging surface of valve seat 22 determines the opening and closing characteristics of the valve 10. Modification of the axial separation of the downstream disc stops 16 from the disc engaging surface of valve seat 22 can easily be achieved by changing the thickness of sealing element 36, thereby changing the force with which the disc 32 engages the valve seat 22 without alteration of the material or the thickness of the disc 32. The downstream disc stops 16 are positioned radially central to the perimeter of the disc 32 and the valve seat 22 allowing the perimeter of the disc 32 to be deformed in an axially downstream and radially inward manner, thus opening a wide annular orifice through the valve 10. The radially outside surface of each downstream disc stops 16 is stepped at an axially intermediate location, forming a radially extending shoulder 48 all of which are concentric with the downstream disc stops 16 and serve to prevent the disc 32 from blocking flow through the valve 10 by extruding into or becoming stuck in the outlet flow passage 42 or in the slots 28 between the segments of the downstream disc stops 16 under the pressure of high flow conditions.

When very little pressure differential is present across the valve 10 or if the pressure of the fluid media in the outlet flow passage 42 exceeds the pressure of the fluid media in the inlet flow passage 34, the disc 32 engages the valve seat 22 and prevents passage of fluid media through the valve 10. In the presence of pressure exerted by the fluid media in the inlet flow passage 34 sufficiently in excess of the pressure of the fluid media in the outlet flow passage 42 to overcome the resilience of disc 32, disc 32 is deformed by the pressure differential such that the upstream surface of disc 32 is axially displaced in the downstream direction from the valve seat 22 and an annular orifice is created allowing the fluid media to flow from the inlet flow passage 34, radially outward across the orifice defined by the valve seat 22 and the surface of disc 32, around the perimeter of disc 32, thence radially inward through the spaces between the downstream disc stops 16 and exiting valve 10 through the outlet flow passage 42.

Since the described preferred embodiment is designed and constructed for miniature applications, the valve 10 is a relatively compact device which in the illustrated preferred embodiment has an axial length on the order of 0.8 inches, an outside diameter in the order of 0.5 inches, with inlet and outlet flow passages 34 and 42 having inside diameters on the order of 0.06 inches. The illustrated preferred embodiment of valve 10 is capable of flow rates up to 0.2 gallons per minute at a pressure differential of 10 pounds per square inch and will withstand back pressure up to 100 pounds per square inch, while opening in response to pressure differentials as low as 4 inches of water. It is anticipated that the valve 10 would function similarly over a wide range of sizes provided the relative proportions were adjusted appropriately absent changes in the materials used.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A flow control valve comprising:
   a. housing means having an inlet end and an outlet end and defining an axial flow passage therebetween comprising an inlet flow passage and an outlet flow passage and a central chamber of increased diameter intermediate between and communicating with both the inlet flow passage and the outlet flow passage;
   b. valve seat means comprising an annular ridge with a full radius rounded surface protruding toward the outlet end, concentric with and surrounding the opening through which the inlet flow passage communicates with the central chamber;
   c. A flexible disc comprised of an elastomeric material transversely positioned across the central chamber and releasably engageable with the valve seat means to prevent the flow of fluid media through the flow passage from the outlet end to the inlet end;
   d. means for prebiasing the disc against the valve seat means comprising a plurality of coaxial, angularly displaced tubular sectors with inside radii about equal to that of the outlet flow passage, forming a discontinuous annulus that surrounds and extends toward the inlet end from the opening of the outlet flow passage into the central chamber, wherein axially extending slots separate the sectors of the disc prebiasing means and define means for providing fluid communication between the outlet flow passage and the central chamber, and the disc prebiasing means further comprise shoulders that protrude radially outward from the disc prebiasing means for limiting the axially downstream and radially inward deformation of the disc; and
   e. support means for preventing the central portion of the disc from being forced into the inlet flow passage, the support means partially surrounding the opening of the inlet flow passage into the central chamber radially central to the valve seat means and protruding toward the outlet end of the valve.

2. The valve of claim 1 wherein said support means comprises an axially extending annulus with an inside radius about equal to that of the inlet flow passage and concentric with the opening of the inlet flow passage into the central chamber and valve seat, and having opening means for providing fluid communication therethrough between the inlet flow passage and the central chamber when the disc engages the support means.

3. The valve of claim 2 wherein the inside surface of the radial wall of the central chamber defines a plurality of axially extending channels providing flow passages around the perimeter of the disc.

4. The valve of claim 3 wherein the valve opens when the pressure of the fluid media in the inlet flow passage is as little as 4 inches of water and the valve is capable of withstanding an excess of pressure in the outlet flow passage over the pressure in the inlet flow passage of up to 100 pounds per square inch.

5. The valve of claim 3 wherein all parts of the valve that are exposed to the fluid media are formed of chemically inert and corrosion resistent material.

* * * * *